United States Patent [19]
Coleman

[11] Patent Number: 6,003,831
[45] Date of Patent: Dec. 21, 1999

[54] INSTRUMENT WITH STAND AND HOOK

[75] Inventor: Christopher R. Coleman, Portland, Oreg.

[73] Assignee: Tektronix, Inc., Wilsonville, Oreg.

[21] Appl. No.: 08/999,694

[22] Filed: Feb. 26, 1998

[51] Int. Cl.[6] .............................. A47G 29/00; A47G 1/24; F16M 1/00
[52] U.S. Cl. ........................ 248/688; 248/455; 248/676; 248/126
[58] Field of Search ................. 248/121, 309.1, 248/455, 688, 692

[56] References Cited

U.S. PATENT DOCUMENTS

| | | | |
|---|---|---|---|
| 1,681,732 | 8/1928 | Gray | 248/688 |
| 4,113,212 | 9/1978 | Coriden | 248/455 |
| 4,259,568 | 3/1981 | Dynesen | 248/676 |
| 4,819,266 | 4/1989 | Awakowicz et al. | 248/126 |
| 4,940,204 | 7/1990 | Nelson et al. | 248/688 |
| 5,620,163 | 4/1997 | Wu | 248/688 |
| 5,765,799 | 6/1998 | Weber | 248/455 |

*Primary Examiner*—Ramon O. Ramirez
*Assistant Examiner*—Michael D. Nornberg
*Attorney, Agent, or Firm*—Bennet K. Langlotz; Thomas F. Lenihan

[57] ABSTRACT

A stand for removably securing a housing of an electrical instrument to another structure. The stand has a support arm connected to the housing, with a free end movable with respect to the housing. A grip element is connected to the arm and is movable over a range of positions along the arm. The grip element has a resilient spring portion biased toward a neutral position near the arm, and the spring portion is movable to a flexed position away from the arm. Thus, the instrument may be secured to a structure by biasing the spring portion against a portion of the structure, often by capturing part of the structure between the spring and the housing, or between the spring and the arm.

12 Claims, 5 Drawing Sheets

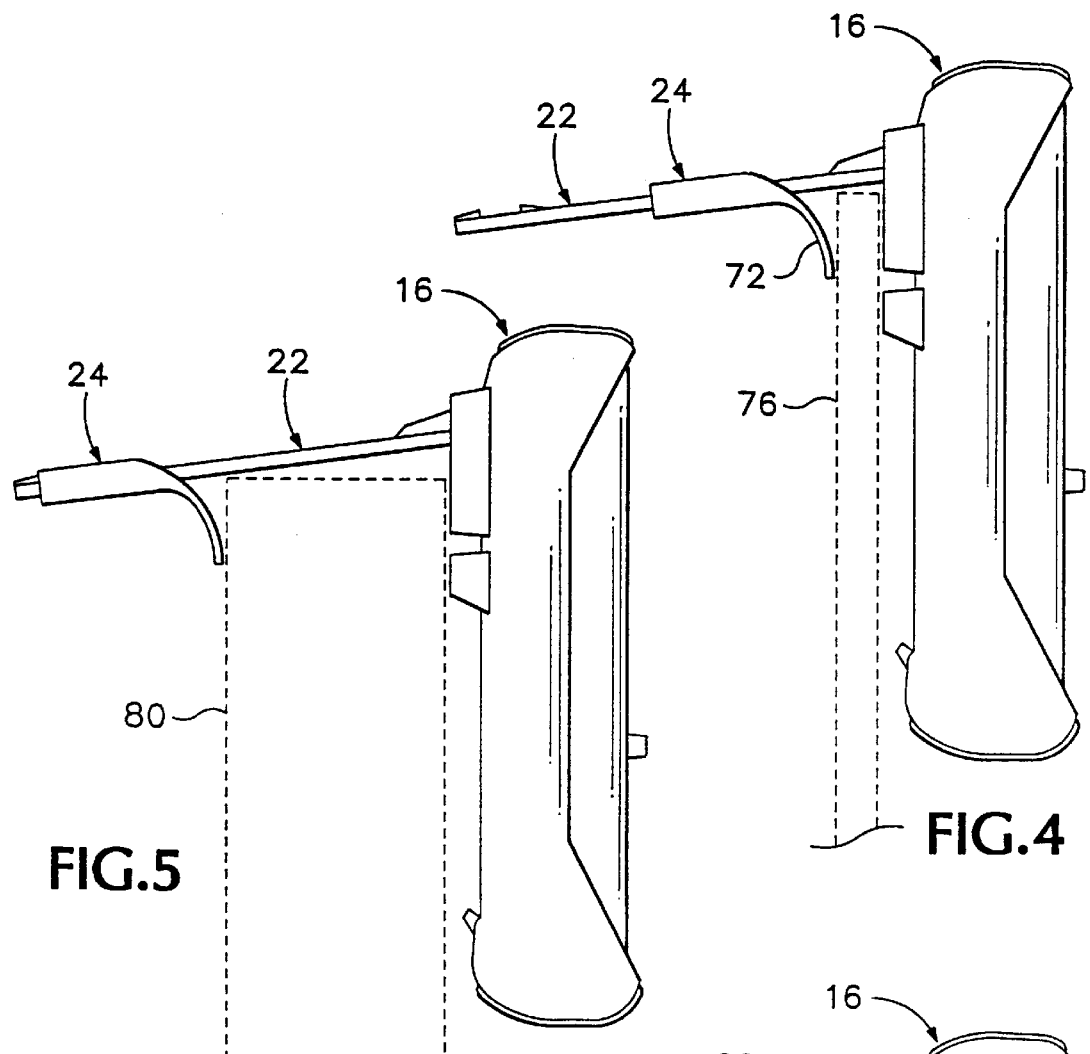
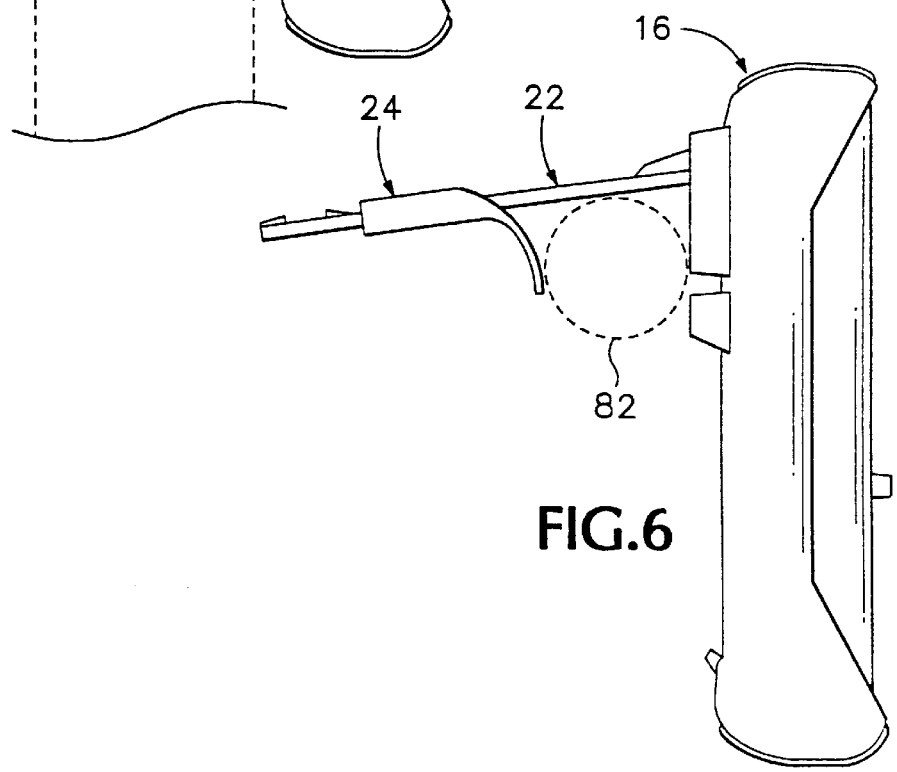

INSTRUMENT WITH STAND AND HOOK

FIELD OF THE INVENTION

The invention relates to electrical instruments, and more particularly to mechanical stands and hooks for resting or hanging instruments on various surfaces and structures.

BACKGROUND AND SUMMARY OF THE INVENTION

A portable hand held electronic instrument such as a digital multimeter may be used in a wide variety of environments. Often, devices under test are located away from conventional table or bench surfaces on which an instrument might normally rest. Because it is often necessary for a technician to have both hands free while using the instrument, a suitable resting or hanging place for the instrument must be found near the circuit under test.

Accordingly, existing instruments have been provided with hinged stands connected to the back of an instrument, so that the instrument may be propped at an angle for viewing on a table top. One such stand also permits the instrument to be suspended by the stand from a variety of structures when a table surface is not available. As disclosed in U.S. Pat. No. 4,940,204 to Nelson et al., a flexible instrument stand may be bent to a variety of shapes for propping the instrument at various angles, and for hanging the instrument on various objects such as a pipe, conduit, nail or stud. The described stand is a planar elastomeric sheet stiffened by a pair of heavy brass wires. These wires permit the stand to be bent into a variety of shapes, and help the stand to retain its shape, in the manner of a wire-reinforced rubber "GUMBY" doll.

While providing some versatility, this existing flexible stand is suitable for connection only to a limited variety of structures, with large pipes or thick walls being particularly difficult. Also, the stand must be straightened for compact stowage against the back of the instrument. It is difficult to avoid residual bends or ripples, which give the instrument an untidy, imprecise aesthetic appearance. Further, a bendable wire has a limited life, and is susceptible to breakage after repeated flexing, particularly at the sharper angles that may be needed to provide increased versatility of connections. When a reinforcing wire breaks, the stand may be rendered useless to support the instrument.

The embodiments disclosed herein overcome these limitations by providing a stand for removably securing a housing of an electrical instrument to another structure. The stand has a support arm connected to the housing, with a free end movable with respect to the housing. A grip element is connected to the arm and is movable over a range of positions along the arm. The grip element has a resilient spring portion biased toward a neutral position near the arm, and the spring portion is movable to a flexed position away from the arm. Thus, the instrument may be secured to a structure by biasing the spring portion against a portion of the structure, often by capturing part of the structure between the spring and the housing, or between the spring and the arm.

BRIEF DESCRIPTION OF THE DRAWINGS

FIGS. 4–9 are side views of the embodiment of FIG. 1 in various configurations mounted on various structures.

DETAILED DESCRIPTION OF A PREFERRED EMBODIMENT

Figure 1:
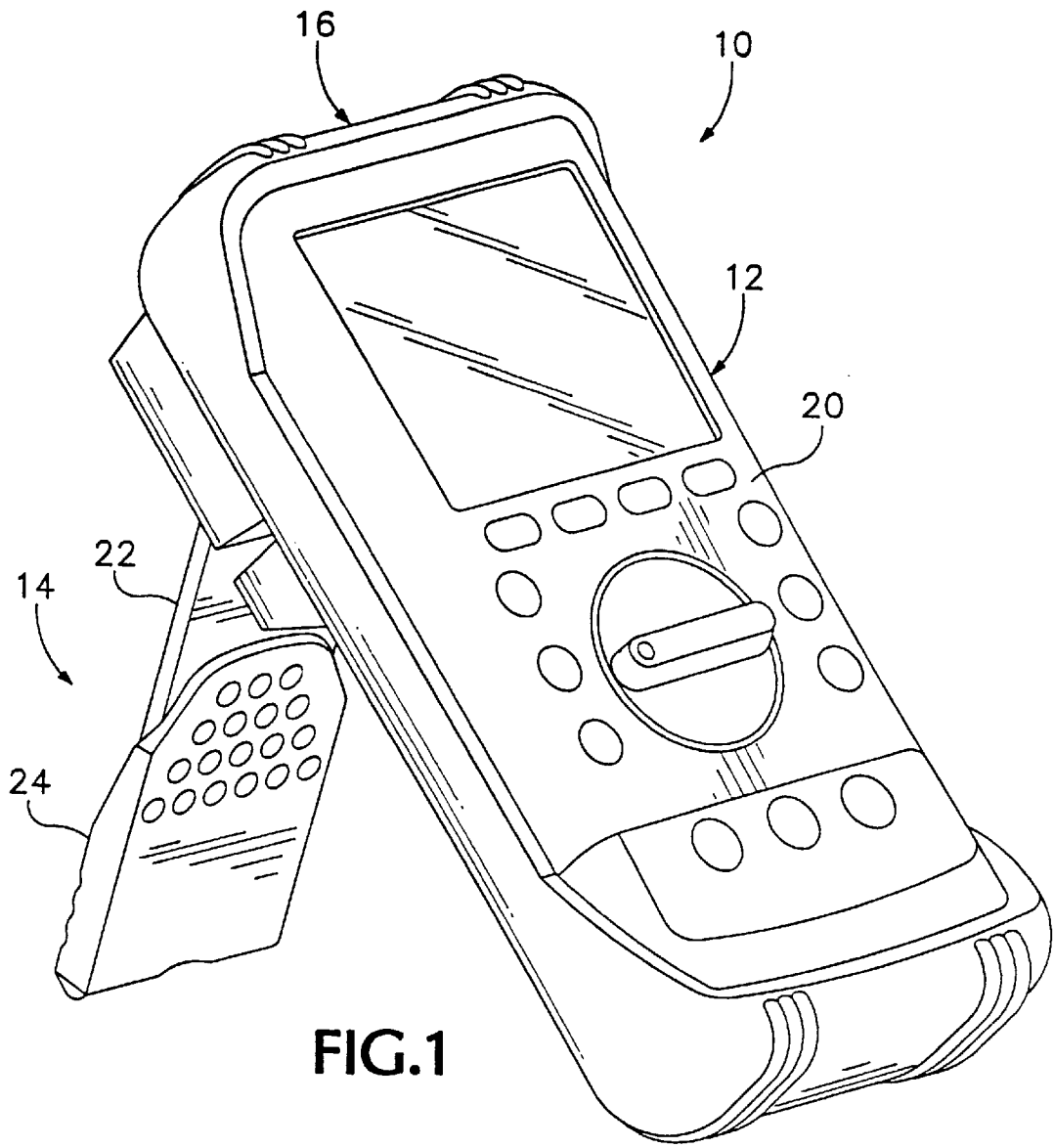
FIG. 1 is a perspective view of an instrument and stand according to a preferred embodiment of the invention.

FIG. 1 shows a digital multimeter 10 having a housing 12 and a support stand 14. The housing includes a resilient outer housing or boot 16 that receives a removable rigid inner housing 20 of the instrument. The stand includes a rigid or resilient flat elongated arm 22, with an elastomeric grip element or sleeve 24 closely received on the arm and slidable along the length of the arm.

Figure 2:
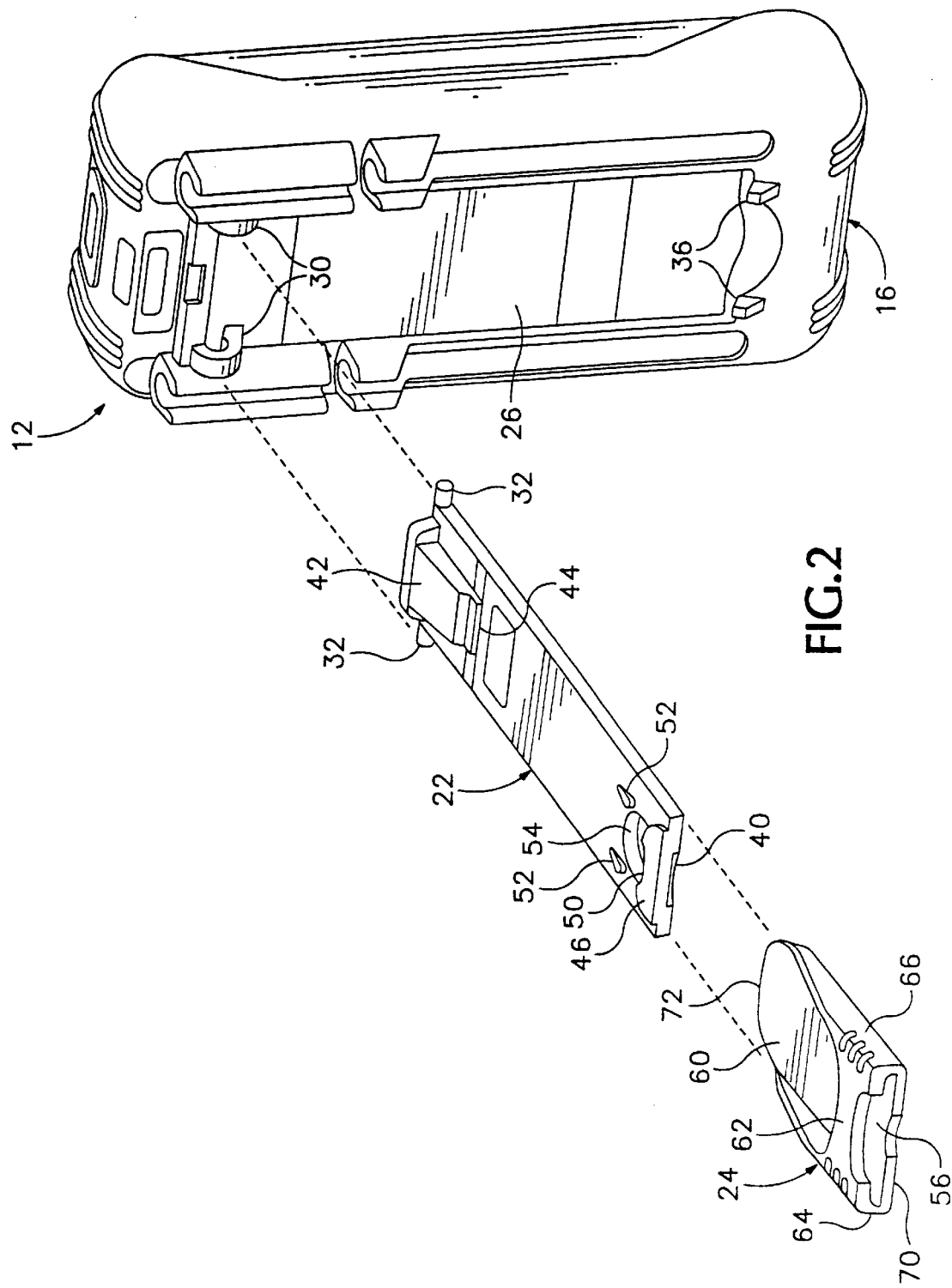
FIG. 2 is an exploded view of the embodiment of FIG. 1.

As shown in FIG. 2, the rear side of the boot 16 defines an elongated recess 26 extending nearly the length of the housing for closely receiving the stand in a stowed position. A pair of hinge pockets 30 at one end of the recess receive a pair of hinge pins 32 at a hinge end of the arm. A pair of latch nubs 36 at the opposite end of the recess engage a free end 40 of the arm to maintain the arm in the stowed position. The nubs are flexible enough to permit the arm to be readily unstowed or restowed with moderate deliberate force.

The arm 22 includes a hinged stop element 42 proximate the hinge end of the arm. The stop is connected to the arm by a live hinge 44, and has a free end extending to the hinge end of the arm, and protruding above the plane of the arm. Thus, the free end of the stop contacts a portion of the boot to limit the angle to which the arm may be folded with respect to the boot. In the latched position shown, the arm is limited to about 90 degrees of pivoting relative to the boot, so that the instrument may stand on a table top without collapsing, as shown in FIG. 1. The stop may be unlatched and folded away from the arm to permit the arm to further pivot, up to about 180 degrees from the original stowed position, as will be illustrated below.

At the free end of the arm, a set of protrusions extend from the arm surface facing away from the boot. An end protrusion 46 has a sloped surface that rises away from the arm surface as it extends from the free end 40. A shoulder 50 of the protrusion 46 prevents accidental removal of the sleeve 24 from the arm, as will be discussed below. The tapered slope of the protrusion 46 permits the sleeve to be readily installed on the arm. A pair of wedge shaped protrusions 52 are spaced apart from the end protrusion, with the thicker shoulder ends of the wedges facing the free end to provide moderate resistance to passage of the sleeve from the free end toward the hinge end of the arm. A hole 54 in the arm between the protrusions permits hanging the instrument on a nail or peg.

The grip element or sleeve 24 defines a wide, flat passage 56 to closely receive the arm. The passage is defined by a flat sleeve base plane 60 and a closely spaced apart band 62, connected to each other at their edges by edge portions 64, 66. The base plane 60 extends from a straight foot edge 70 to a tapered tongue 72. The band 62 is located over the foot edge of the base, so that the tongue extends well beyond the band. The edge portions taper toward the tongue end, providing stiffer resistance to flexing near the band, and gentler resistance near the tip of the tongue.

Figure 3:
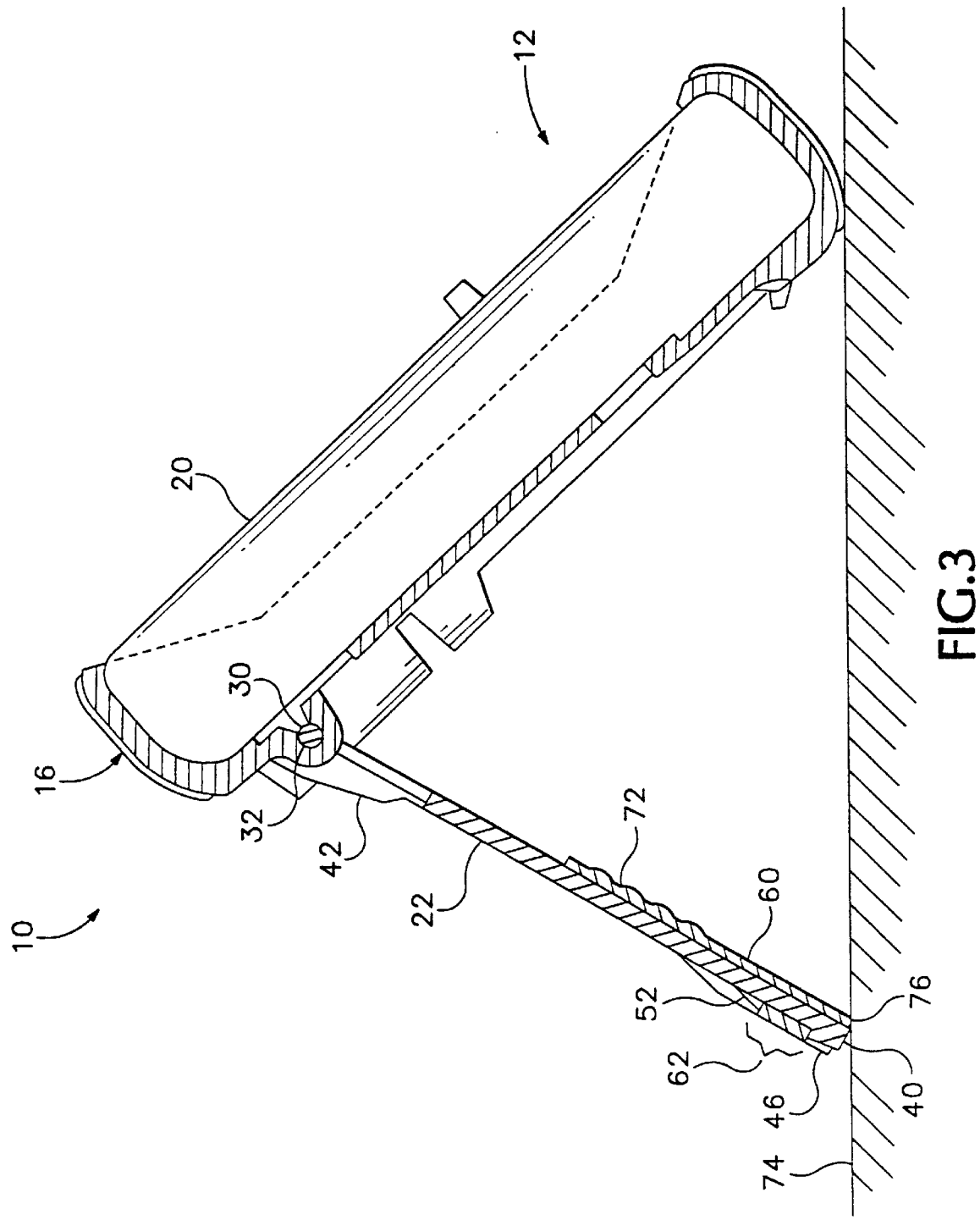
FIG. 3 is a sectional side view of the embodiment of FIG. 1.

As shown in FIG. 3, the instrument 10 rests on a horizontal surface 74, and the arm is pivoted by nearly 90 degrees from the stowed position with the stop 42 in contact with the boot. The grip element band 62 is sized and shaped to be closely received between the protrusions 46, 52, securing the sleeve in a remote position shown. In the remote position, a toe portion 76 at the corner of each sleeve edge portion 64, 66 at the foot edge 70 protrudes below the level of the lowest portion of the arm's free end 40. This provides slip resistant contact between the elastomeric sleeve and the surface 74, avoiding a low-friction direct contact between the rigid plastic arm and the surface. The instrument may be propped at a range of angles without reliance on the limiting effect of the stop 42, with surface contact being made only by the high friction sleeve toes and by the boot.

FIGS. 4 through 9 show how the instrument may be mounted to a variety of surfaces and structures. In FIG. 4, the housing back rests against one side of a vertical panel or thin door 76. The arm 22 extends perpendicularly from the housing, with a portion of the arm near the housing and hinge resting atop the upper edge of the door 76. The sleeve 24 has been shifted toward the housing, with the tongue 72 splayed downward away from the arm, and pressed against the back of the door. The spring force of the resilient tongue maintains pressure against the door so that the door is squeezed between the housing and the tongue. The sustained force in the tongue also generates a rotational force that cocks the sleeve relative to the arm. This eccentric loading, together with the high friction coefficient between the sleeve and arm prevents the sleeve from sliding toward the free end of the arm in response to the tongue force. Thus, the point or region of contact by the tongue is well offset from the arm, providing substantial torque to allow the grip element to be cinched tightly against the structure 76 to resist unwanted dislodgement of the instrument from its mounted position, even in an environment subject to vibrations or other forces.

FIG. 5 shows the instrument mounted to a thick panel or wall 80, with the elements arranged similarly to the installation of FIG. 4, but with the grip sleeve 24 position at its remote position secured by the protrusions on the arm. This represents the maximum thickness structure that may be captured by the stand assembly. By positioning the sleeve at any of the range of intermediate positions, panels of different thickness may be accommodated. As shown in FIG. 6, a horizontal cylindrical structure such as a pipe 82 may also provide a mounting location for the instrument. The diameter of such structures on which the instrument may be mounted is limited by the length of the tongue, which should extend a distance from the arm at least about equal to the radius of the cylinder.

Figures 7, 8, 9:
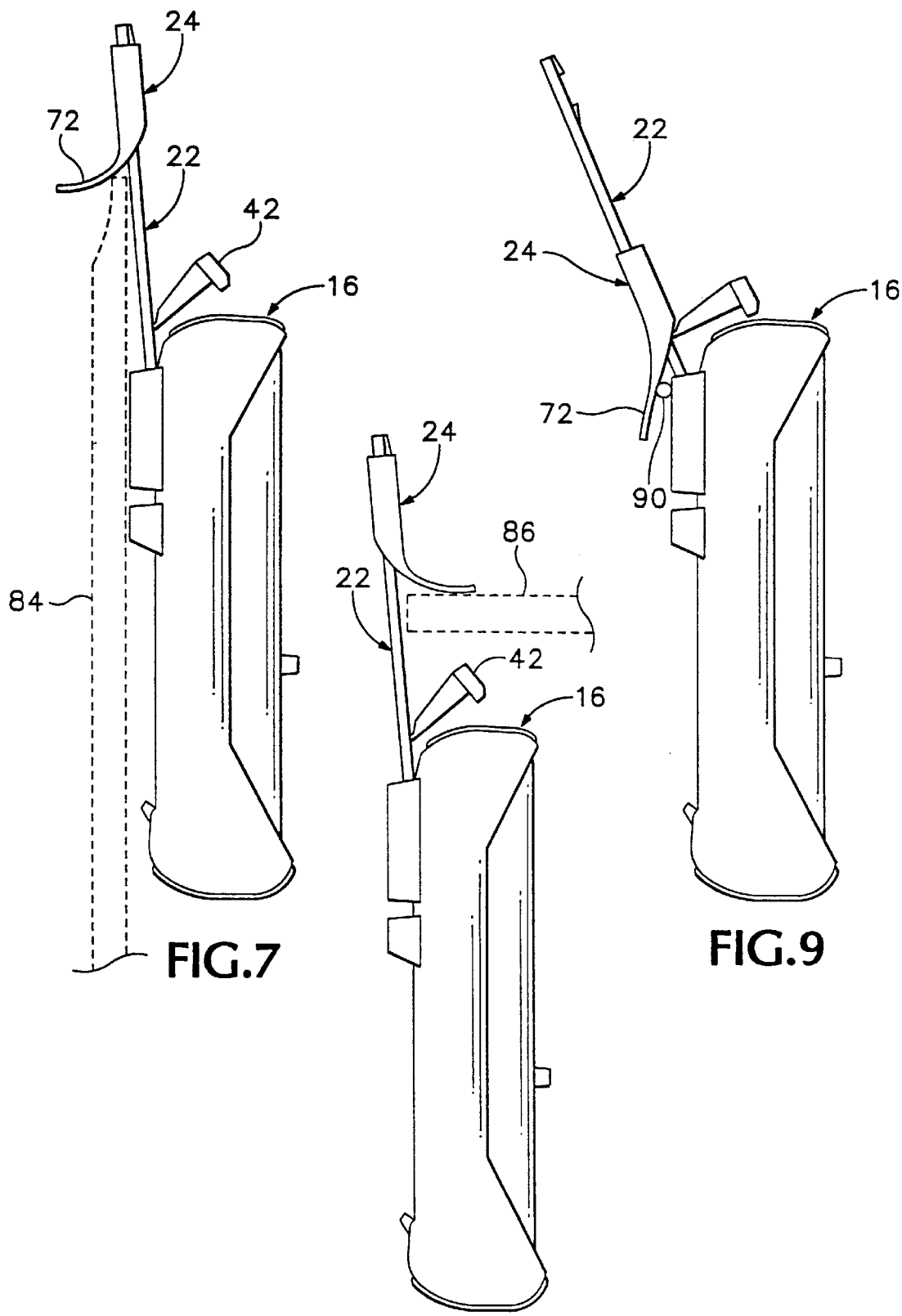

FIG. 7 shows the instrument mounted to a thin sheet or panel 84, such as might be found as a door on an electrical service panel enclosure. The stop 42 has been disengaged from the arm, allowing the arm to freely swing to a vertically extending position above the vertically oriented instrument. With the grip sleeve 24 secured in the remote position, the upper edge of the structure 84 is slipped between the tongue 72 and the arm. The spring force of the flexed tongue resists movement of the instrument. FIG. 8 shows a similar configuration, except that the grip sleeve 24 has been removed and reinstalled with the tongue on the opposite surface of the arm, so that it may rest on a horizontal surface 86 with a free edge extending away from the instrument user.

In FIG. 9, the arm 22 is extended freely upward, and the grip sleeve 24 is positioned close to the housing boot 16. A wire or cord 90 is captured between the tongue 72 and the boot. A thin panel may also be similarly captured in other circumstances.

In the preferred embodiment, the boot is formed of a thermoplastic olefin elastomer such as Sarlink 3170, from DSM Thermoplastic Elastomers of Massachusetts; the arm is formed of a rigid polypropylene homopolymer such as MONTELL PRO FAX 6331 polypropylene homopolymer from RTP Company of Minnesota; the sleeve is formed of a Thermoplastic elastomer such as SANTOPRENE 101-64 elastomer from Advanced Elastomer Systems, of Ohio.

While the disclosure is made in terms of a preferred embodiment, the invention is not intended to be so limited.

I claim:

1. An electrical instrument comprising:

a housing;

a support arm connected to the housing and having a free end movable with respect to the housing;

a grip element connected to the arm and movable over a range of positions along the arm;

the grip element having a resilient spring portion biased toward a neutral position proximate to the arm, and movable to a flexed position away from the arm, such that the instrument may be secured to a structure by placing a portion of the structure between the spring portion and another element of the instrument;

wherein the arm is pivotally connected to the housing; and wherein the grip element includes a sleeve portion receiving the arm, such that the grip element is movable over a range of positions on the arm.

2. The instrument of claim 1 wherein at least a portion of the sleeve portion is elastomeric, such that it resists sliding along the arm when cocked or rotated with respect to the arm.

3. The instrument of claim 1 wherein the grip element includes a resilient tongue extending along the arm and toward the housing.

4. The instrument of claim 1 wherein the arm has a free end movable away from the housing, and wherein the arm includes a securement element proximate the free end, such that the grip element is restrained against dislodgement from an extended position at the free end by engaging to the securement element.

5. The instrument of claim 4 wherein the grip element includes an extending elastomeric foot portion extending beyond the free end of the arm when the grip element is in the extended position, such that when the instrument rests on a surface, while supported by the arm, the elastomeric foot resists sliding along the surface.

6. The instrument of claim 1 wherein the arm is a rigid elongated planar member pivotable between a stowed position in which the arm rests against a major planar surface of the housing, and a range of angled positions away from the housing, and wherein the grip element includes a flat sleeve closely receiving the arm, and the sleeve having a major sleeve portion closely captured between the arm and the housing when the arm is in the stowed position.

7. The instrument of claim 6 wherein the grip element includes a tongue extending parallel to the major sleeve portion.

8. An apparatus for removably securing a housing of an electrical instrument to a structure, the apparatus comprising:

a support arm connected to the housing and having a free end movable with respect to the housing;

a grip element connected to the arm and movable over a range of positions along the arm; and the grip element having a resilient spring portion biased toward a neutral position proximate to the arm, and movable to a flexed position away from the arm, such that the instrument may be secured to a structure by biasing the spring portion against a portion of the structure;

wherein the arm is pivotally connected to the housing;

wherein the grip element is elastomeric; and wherein the grip element includes a sleeve portion receiving the arm, such that the grip element is movable over a range of positions on the arm.

9. The apparatus of claim 8, wherein the grip element includes a resilient tongue extending along the arm and toward the housing.

10. The apparatus of claim 8 wherein the arm has a free end movable away from the housing, and wherein the arm includes a securement element proximate the free end, such that the grip element is restrained against dislodgement from an extended position at the free end by engaging to the securement element.

11. The apparatus of claim 8 wherein the grip element includes an extending elastomeric foot portion extending beyond the free end of the arm when the grip element is in the extended position, such that when the instrument rests on a surface, while supported by the arm, the elastomeric foot resists sliding along the surface.

12. The apparatus of claim 8 wherein the arm is a rigid elongated planar member pivotable between a stowed position in which the arm rests against a major planar surface of the housing, and a range of angled positions away from the housing, and wherein the grip element includes a flat sleeve closely receiving the arm, and the sleeve having a major sleeve portion closely captured between the arm and the housing when the arm is in the stowed position.

* * * * *